United States Patent
De Los Reyes et al.

(10) Patent No.: US 8,909,535 B2
(45) Date of Patent: *Dec. 9, 2014

(54) SYSTEM AND METHOD FOR TRACKING PERSONS OF INTEREST VIA VOICEPRINT

(71) Applicant: AT&T Intellectual Property II, L.P., Atlanta, GA (US)

(72) Inventors: Gustavo De Los Reyes, Fair Haven, NJ (US); Sanjay Macwan, Marlboro, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/785,294

(22) Filed: Mar. 5, 2013

(65) Prior Publication Data

US 2013/0177141 A1    Jul. 11, 2013

Related U.S. Application Data

(63) Continuation of application No. 13/305,053, filed on Nov. 28, 2011, now Pat. No. 8,392,196, which is a continuation of application No. 11/762,399, filed on Jun. 13, 2007, now Pat. No. 8,086,461.

(51) Int. Cl.
*G10L 17/00* (2013.01)
*H04M 3/22* (2006.01)
*H04M 3/42* (2006.01)

(52) U.S. Cl.
CPC ........ *H04M 3/2281* (2013.01); *H04M 2201/41* (2013.01); *H04M 3/42221* (2013.01); *G10L 17/005* (2013.01)

USPC .......................................................... 704/273

(58) Field of Classification Search
USPC ........................................ 704/246–250, 273
See application file for complete search history.

(56) References Cited

U.S. PATENT DOCUMENTS

| | | | |
|---|---|---|---|
| 5,023,901 A | 6/1991 | Sloan et al. | |
| 5,535,261 A | 7/1996 | Brown et al. | |
| 6,064,963 A | 5/2000 | Gainsboro | |
| 6,171,090 B1 | 1/2001 | Hurley | |
| 6,327,343 B1 | 12/2001 | Epstein et al. | |
| 6,336,092 B1 | 1/2002 | Gibson et al. | |
| 6,356,868 B1 | 3/2002 | Yuschik et al. | |
| 6,510,415 B1 * | 1/2003 | Talmor et al. ................ | 704/273 |
| 6,807,253 B2 | 10/2004 | Won | |
| 7,006,605 B1 | 2/2006 | Morganstein et al. | |
| 7,088,220 B2 | 8/2006 | Kotzin | |
| 7,231,019 B2 | 6/2007 | Pascovici | |
| 7,240,007 B2 | 7/2007 | Junqua et al. | |
| 7,299,177 B2 | 11/2007 | Broman et al. | |
| 7,340,042 B2 | 3/2008 | Cluff et al. | |
| 7,409,343 B2 * | 8/2008 | Charlet ........................ | 704/246 |
| 7,487,089 B2 | 2/2009 | Mozer | |
| 7,590,232 B2 | 9/2009 | Carter et al. | |

(Continued)

FOREIGN PATENT DOCUMENTS

EP    1202228    5/2002

*Primary Examiner* — Abul Azad

(57) ABSTRACT

Disclosed are systems, methods, and computer readable media for tracking a person of interest. The method embodiment comprises identifying a person of interest, capturing a voiceprint of the person of interest, comparing a received voiceprint of a caller with the voiceprint of the person of interest, and tracking the caller if the voiceprint of the caller is a substantial match to the voiceprint of the person of interest.

20 Claims, 2 Drawing Sheets

(56) References Cited

U.S. PATENT DOCUMENTS

| | | |
|---|---|---|
| 8,086,461 B2 | 12/2011 | De Los Reyes et al. |
| 8,401,245 B2 * | 3/2013 | Hashimoto ............... 382/115 |
| 2004/0190688 A1 | 9/2004 | Timmins et al. |
| 2006/0020459 A1 * | 1/2006 | Carter et al. ............... 704/246 |
| 2006/0188076 A1 | 8/2006 | Isenberg |
| 2007/0219801 A1 * | 9/2007 | Sundaram et al. ............ 704/270 |
| 2008/0091425 A1 | 4/2008 | Kane |
| 2008/0300877 A1 | 12/2008 | Gilbert et al. |

* cited by examiner

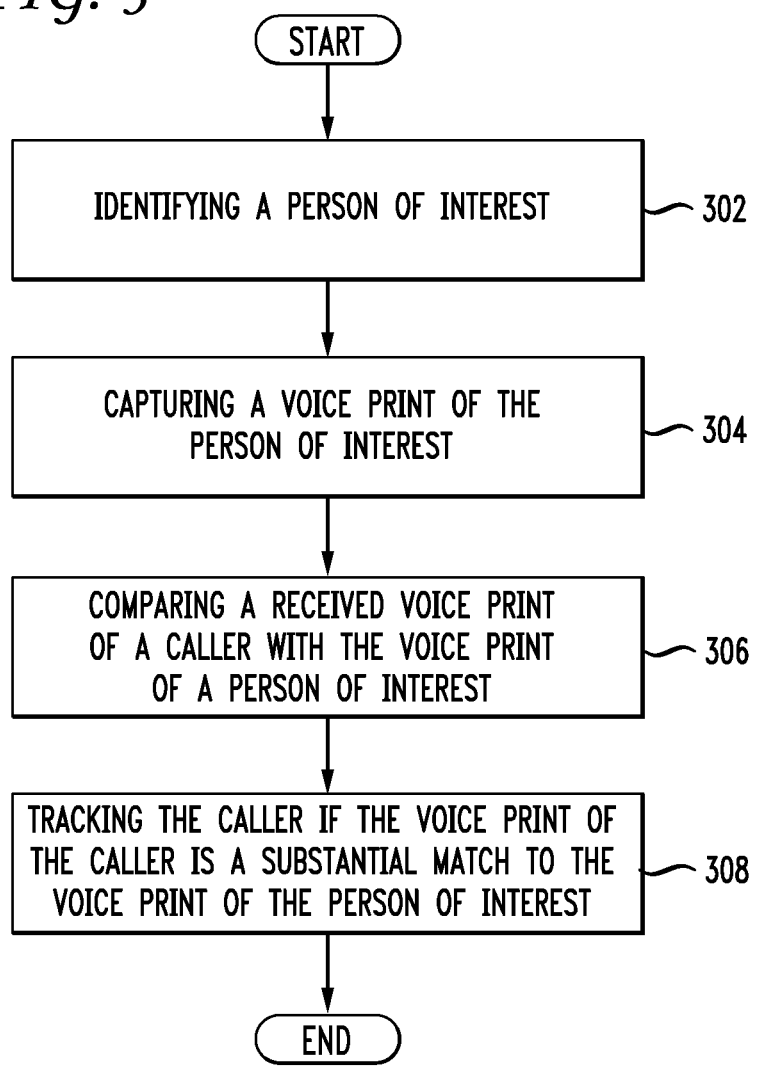

SYSTEM AND METHOD FOR TRACKING PERSONS OF INTEREST VIA VOICEPRINT

PRIORITY INFORMATION

The present application is a continuation of U.S. patent Ser. No. 13/305,053, filed Nov. 28, 2011, which is a continuation of U.S. patent application Ser. No. 11/762,399, filed Jun. 13, 2007, now U.S. Pat. No. 8,086,461, issued Dec. 27, 2011, the content of which is incorporated herein in its entirety.

BACKGROUND OF THE INVENTION

1. Field of the Invention

The present invention relates generally to tracking persons and more specifically, to tracking a person of interest through voiceprint identification instead of tracking a caller through specific telephone numbers.

2. Introduction

Currently, when law enforcement or other groups wish to track a specific person's telephone conversations, they must first identify particular phone numbers from which the caller is likely to place calls or phone numbers likely to be called. The identified phone numbers are monitored for calls made and calls received in order to track various aspects of the person, such as location, plans, contacts, etc. Often, as is the case when tracking criminals or terrorists, a tracked person will use borrowed or stolen phones, payphones, disposable cellular phones, pre-paid cellular phones, or even no telephone at all by using VoIP on a computer or similar communications means. Such practices frustrate tracking of persons by monitoring specific telephone numbers. Accordingly, what is needed in the art is a method of tracking a person's telephone and other audio communications independent of specific communications devices.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed herein are system, methods, and computer readable media for tracking a person of interest. An exemplary method embodiment of the invention comprises identifying a person of interest, capturing a voiceprint of the person of interest, comparing a received voiceprint of a caller with the voiceprint of the person of interest, and tracking the caller if the voiceprint of the caller is a substantial match to the voiceprint of the person of interest.

The principles of the invention may be utilized to provide, for example in a law enforcement or counter-terrorism setting, more complete and/or flexible tracking of criminal activity conducted over a telephone or other network capable of transmitting audio signals because the tracking is not tied to specific communications devices (like phones) or communications device unique identifiers (like phone numbers). In this manner, if a person being tracked uses disposable, borrowed, or stolen phones, or even a payphone, the tracking effort is not frustrated. A person being tracked would be discovered almost as soon as he used a communications device like a telephone, regardless of whether the device was previously linked in any way to him.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a method embodiment of the invention.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
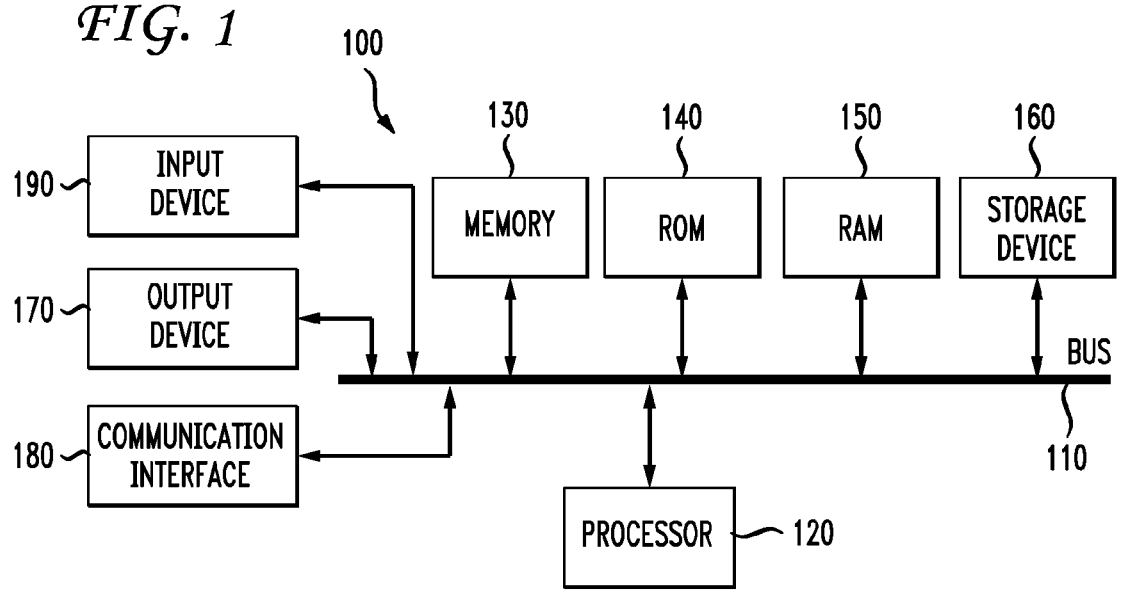
FIG. 1 illustrates a basic system or computing device embodiment of the invention.

With reference to FIG. 1, an exemplary system for implementing the invention includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS), containing the basic routine that helps to transfer information between elements within the computing device 100, such as during start-up, is typically stored in ROM 140. The computing device 100 further includes storage means such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output means. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative embodiment of the present invention is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 2:
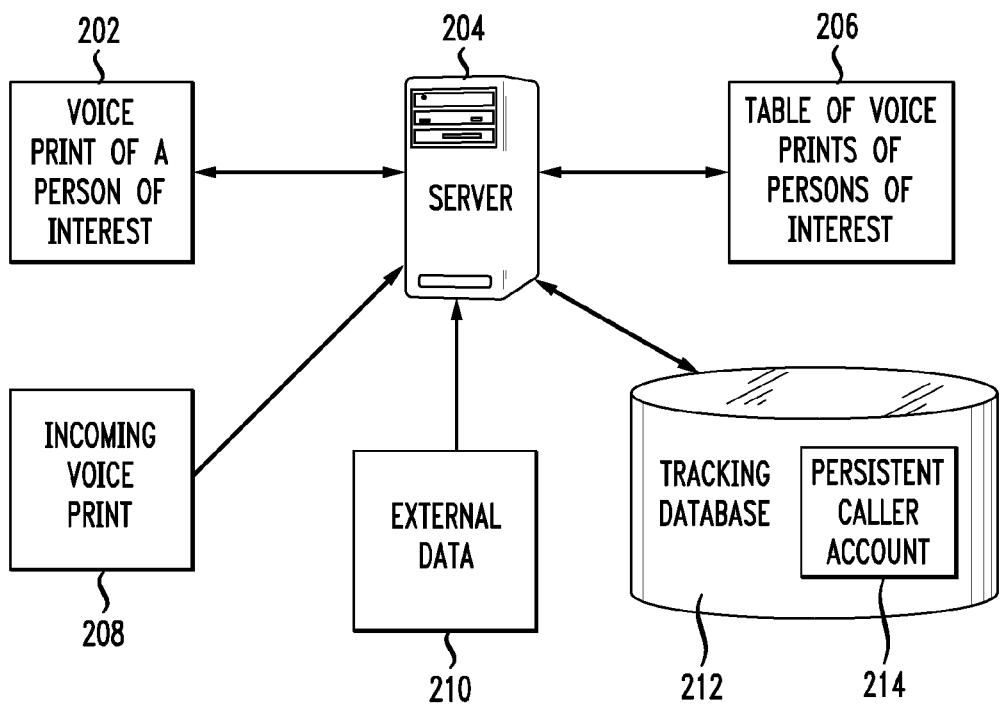
FIG. 2 illustrates an example system for tracking persons of interest.

The present invention relates to tracking a person of interest via voiceprints of audio communications. One preferred example and application to which the present invention may be applied relates to law enforcement tracking a criminal or other person of interest, perhaps an accomplice or suspected criminal, by identifying the voiceprint of the person of interest and tracking the person based on voiceprint rather than based on a specific telephone number or set of telephone numbers. FIG. 2 illustrates a basic example of a server 204 that captures a voiceprint of a person of interest 202 and stores it in a table of voiceprints of persons of interest 206. The server may be any suitable computing device or devices, local, distributed, or otherwise, as can be appreciated by one skilled in the art. For example, the server and table of voiceprints of persons of interest may be a large centralized computer or cluster of computers across the network from the actual telephone or the server may be more modest, even residing in a cellular phone. Of course, the computing power and storage capacity of even an advanced cellular phone is typically orders of magnitude less than that of a cluster of computers, so practicality of storage or speed or other reasons may influence the location of the server and table of voiceprints of persons of interest.

The voiceprint of the person of interest may be captured in many ways. As an example, in criminal booking procedures fingerprints are gathered to assist police should the person commit future crimes. Criminal booking procedures could easily be extended to include obtaining a voiceprint in case of a future need to track the person. If such a procedure becomes standard, then a nationwide database of potentially useful voiceprints could be gathered and maintained for use with this system. As another example, capturing a voiceprint could be done through listening in to phone calls placed from the person's home phone, cell phone, or phones of relatives until a suitable voiceprint is captured. These conventional methods of tracking a specific phone number may be used to obtain the initial voiceprint of the person of interest. Once a voiceprint of a person of interest is captured, it is stored in a table of voiceprints of persons of interest 206.

The voiceprints of incoming calls 208 are compared to the table of voiceprints of known persons to check for a match. Again, practicality of storage, computing speed and other reasons may influence the location of the table of voiceprints of persons of interest. As cell phone memories grow, a telecommunications company could allocate a portion of the memory of each sold cell phone for storing, as an example, the voiceprints of the FBI's top ten most wanted people, or other similar list of persons of particular interest, and compare those voiceprints to the voiceprints in each phone call placed on the cell phone, while reserving other larger tables of voiceprints of persons of interest for larger computers or clusters of computers residing across a network. In another potential embodiment, a limited table of voiceprints of persons of interest could be stored on a cell phone or other communications device while a larger table of voiceprints of persons of interest resides across a network for the purpose of verifying voiceprint matches made by the communications device. Single-tier and multiple-tier voiceprint tables and voiceprint comparison systems are contemplated.

In order to match voiceprints, a dynamic threshold of certainty may be applied. External data 210 may be a factor in adjusting the threshold of certainty for a voiceprint match. Such external data may include one or more of the following or other data: the location the phone call is placed from, the phone number dialed, the phone the call is placed from, the time of day, the text of the conversation, and/or the community of interest.

A community of interest in this sense is who a person calls, what they do when they're on the phone, what times of day a person tends to call during, etc. This information "profile" can assist in identifying trends that can increase the likelihood of identifying an individual.

If the call is placed to a close associate of the person of interest, such as a mother, close friend, or business partner, if the call is placed from a cell phone within 1 mile of the person of interest's house or workplace, if the call is placed during a time of day that the person of interest typically places phone calls or perhaps immediately following a crime the person of interest is wanted for, or if the call is placed from the home of the person of interest, the dynamic threshold of certainty may be lowered substantially. As another example, if the call is placed from a home phone line instead of a cell phone, of a house that is several states away, the dynamic threshold of certainty could be raised to ensure an accurate match and to avoid generating false leads.

After a substantial match is found between the first and second voiceprints that satisfies the dynamic threshold of certainty, the server tracks the caller by recording information about the caller. This recorded information could be stored in a tracking database 212. Multiple pieces of information could be recorded. The actual audio of the conversation, a transcription of the conversation, duration of the call, time of day, geographic location, rate of movement, ambient noise, phone number dialed, any additional buttons pressed on the phone, or any other information about the call, caller, or recipient of the call may be recorded in the tracking database.

Recorded information could be stored in a persistent caller account 214 in the tracking database. As the person of interest makes calls and is identified, any recorded information could be stored in one account in the database which may serve to aid tracking efforts. Available information about each call placed, such as location, time of day, persons called, etc. may identify the travel or work patterns of a person of interest so that they may be tracked and located, if desired.

Once a substantial voiceprint match is established, the server may also fine-tune or adjust the voiceprint in the table of voiceprints of persons of interest based on the voiceprint in the call. If the incoming voiceprint is a higher quality audio signal or simply a longer sample, more data may be obtained which may be used to compute a more accurate and/or more complete voiceprint. If a person of interest only provides a short sample voiceprint or attempts to distort his voice during the voiceprint capture, then fine-tuning the voiceprint of the person of interest based on additional positive voiceprint matches can serve to improve a voiceprint of less than optimal quality.

FIG. 3 illustrates a method embodiment of the invention. First, the method comprises identifying a person of interest (302). Second, the method comprises capturing a voiceprint of the person of interest (304). The voiceprint can be captured many ways, although it could be most easily captured through monitoring the communication of the person of interest until a voiceprint of suitable length and suitable quality is obtained. Law enforcement booking procedures may be established to collect a voiceprint in addition to fingerprints and photographs in the event that the person becomes a person of interest at a later date. Third, the method comprises comparing a received voiceprint of a caller with the voiceprint of the person of interest (306). The threshold of certainty of a match for the voiceprints may be dynamic and may be influenced by external data, such as geographic location, time of day, etc. The caller does not need to make calls on landline telephone, cell phone, or on any phone. The caller may use VoIP transmissions or any other means for transmitting audio signals, whether alone or in combination with other signals, including video signals. Fourth, the method comprises tracking the caller if the voiceprint of the caller is a substantial match to the voiceprint of the person of interest (308). As has been discussed herein, the threshold of match certainty may be dynamic and may be influence by information other than the voiceprints. The threshold certainty factors may include the number dialed, the number called from, the geographic location called from, time of day, etc. Recorded information about the caller may include audio of the conversation, the phone number dialed from and the phone number dialed to, the duration of the call, etc.

An additional step may be to fine-tune the voiceprint of a person of interest using the voiceprint of the caller if the two are a match (310). A person of interest may not willingly allow his voiceprint to be captured or the person of interest may be under clandestine surveillance, so a quality voiceprint may be difficult to obtain. In such situations, when the voiceprint of a caller matches the captured voiceprint of the person of interest, the additional voiceprint information may be used to further enhance the voiceprint of the person of interest.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, audio streams such as voice-enabled online social interaction, like chatting during online video games, could be compared for voiceprint matches to track a specific player regardless of the specific location, computer, or game he is playing. Accordingly, the appended claims and their legal equivalents should only define the invention, rather than any specific examples given.

We claim:

1. A method of comprising:
   receiving a voiceprint associated with a caller;
   determining, via a processor, a level of certainty between the voiceprint and a stored voiceprint, wherein the stored voiceprint is associated with an individual;
   establishing a tracking threshold based on a relationship between the caller and a call recipient;
   adjusting the tracking threshold based on data external to the voiceprint, to yield an adjusted threshold; and
   when the level of certainty meets the adjusted threshold, tracking the caller.

2. The method of claim 1, wherein the level of certainty is based on one of a location of the caller, a phone number, a device associated with the caller, a time of day, a content of the voiceprint, an information profile, and a person communicating with the caller.

3. The method of claim 1, further comprising fine-tuning the stored voiceprint based on the voiceprint.

4. The method of claim 1, further comprising storing the voiceprint in a database.

5. The method of claim 4, wherein the stored voiceprint is also stored in the database.

6. The method of claim 1, further comprising storing external data associated with the voiceprint, wherein the external data comprises one of a content, a transcription, a duration, a time of day, a location, a device, a rate of movement, a phone number, a button pressed, an ambient noise, the call recipient, and the caller.

7. The method of claim 1, wherein the tracking of the caller is performed by recording information associated with a communication device used by the caller.

8. A system comprising:
 a processor; and
 a computer-readable storage device having instructions stored which, when executed by the processor, cause the processor to perform operations comprising:
  receiving a voiceprint associated with a caller;
  determining a level of certainty between the voiceprint and a stored voiceprint, wherein the stored voiceprint is associated with an individual;
  establishing a tracking threshold based on a relationship between the caller and a call recipient;
  adjusting the tracking threshold based on data external to the voiceprint, to yield an adjusted threshold; and
  when the level of certainty meets the tracking threshold, tracking the caller.

9. The system of claim 8, wherein the level of certainty is based on one of a location of the caller, a phone number, a device associated with the caller, a time of day, a content of the voiceprint, an information profile, and a person communicating with the caller.

10. The system of claim 8, the computer-readable storage device having additional instructions stored which result in operations comprising fine-tuning the stored voiceprint based on the voiceprint.

11. The system of claim 8, the computer-readable storage device having additional instructions stored which result in operations comprising storing the voiceprint in a database.

12. The system of claim 11, wherein the stored voiceprint is also stored in the database.

13. The system of claim 8, the computer-readable storage device having additional instructions stored which result in operations comprising storing external data associated with the voiceprint, wherein the external data comprises one of a content, a transcription, a duration, a time of day, a location, a device, a rate of movement, a phone number, a button pressed, an ambient noise, the call recipient, and the caller.

14. The system of claim 8, wherein the tracking of the caller is performed by recording information associated with a communication device used by the caller.

15. A computer-readable storage device having instructions stored which, when executed by a computing device, cause the computing device to perform operations comprising:
 receiving a voiceprint associated with a caller;
 determining a level of certainty between the voiceprint and a stored voiceprint, wherein the stored voiceprint is associated with an individual;
 establishing a tracking threshold based on a relationship between the caller and a call recipient;
 adjusting the tracking threshold based on data external to the voiceprint, to yield an adjusted threshold; and
 when the level of certainty meets the tracking threshold, tracking the caller.

16. The computer-readable storage device of claim 15, wherein the level of certainty is based on one of a location of the caller, a phone number, a device associated with the caller, a time of day, a content of the voiceprint, an information profile, and a person communicating with the caller.

17. The computer-readable storage device of claim 15, having additional instructions stored which result in operations comprising fine-tuning the stored voiceprint based on the voiceprint.

18. The computer-readable storage device of claim 15, having additional instructions stored which result in operations comprising storing the voiceprint in a database.

19. The computer-readable storage device of claim 18, wherein the stored voiceprint is also stored in the database.

20. The computer-readable storage device of claim 15, having additional instructions stored which result in operations comprising storing external data associated with the voiceprint, wherein the external data comprises one of a content, a transcription, a duration, a time of day, a location, a device, a rate of movement, a phone number, a button pressed, an ambient noise, the call recipient, and the caller.

* * * * *